Fig. 1.

Sept. 13, 1955            H. G. LYKKEN           2,717,741
HORIZONTAL APPARATUS AND METHOD FOR DISINTEGRATING
AND CLASSIFYING DRY MATERIALS
Filed May 15, 1953                             5 Sheets-Sheet 2

INVENTOR.
HENRY G. LYKKEN
BY Paul, Moore & Dugger
ATTORNEYS

INVENTOR.
HENRY G. LYKKEN
BY Paul, Moore & Rugger
ATTORNEYS

Sept. 13, 1955    H. G. LYKKEN    2,717,741
HORIZONTAL APPARATUS AND METHOD FOR DISINTEGRATING
AND CLASSIFYING DRY MATERIALS
Filed May 15, 1953    5 Sheets-Sheet 4

*INVENTOR.*
HENRY G. LYKKEN
BY Paul Moore & Dugger
ATTORNEYS

INVENTOR.
HENRY G. LYKKEN

United States Patent Office 2,717,741
Patented Sept. 13, 1955

2,717,741

HORIZONTAL APPARATUS AND METHOD FOR DISINTEGRATING AND CLASSIFYING DRY MATERIALS

Henry G. Lykken, Minneapolis, Minn., assignor to The Microcyclomat Co., Minneapolis, Minn., a corporation of Delaware Application May 15, 1953, Serial No. 355,296

24 Claims. (Cl. 241—19)

This invention relates to an apparatus for disintegrating materials in the dry state and for classifying the disintegrated particles in an integrated operation. In reducing any dry material to a range below 100 mesh and particularly to the subsieve sizes, it is essential, for most operations, to remove the finished sizes progressively and completely from the grinding zone as soon as they are produced. If the finished sizes are not completely segregated and promptly removed, inefficiency in the milling operation will ensue, not only due to reduction beyond the desired size particles, but also due to the cushioning effect of the finer material in the charge. The removal of the desired size and smaller may be designated as scavenging. The difference between a poor scavenging of a mill producing particles of particular sizes or complete and effective scavenging may, and frequently does, make a difference of 200 to 300% in grinding efficiency, particularly in the finer ranges. If material reduced to the desired fineness is not promptly withdrawn from the mill charge, it is subjected to continuing reduction at increasing cost. Such further reductions are in many cases undesirable since in a large number of grinding operations the particles of a specified size, with a minimum of superfines, may be desired. For example, sugar for chocolate coatings should preferably be ground to 30 microns with a minimum content of superfines.

In the milling of clays, kaolin, talc, natural pigments, graphites, etc. the wanted material is soft. They are lighter and reduce to fine particle sizes much more readily than does sand, silica, grit and harder gangue materials that are present in deposits of such substances in nature. In this instance, the problem is to eliminate the contaminating material with little or no reduction, returning only the yet unreduced wanted softer material to the feed for further reduction.

In the milling of heat sensitive materials, such as DDT, cocoa, and many natural and synthetic resins, little heating is tolerated due to increasing resistance to reduction as the temperature rises. In the case of many materials, grinding can be effected only at very low temperatures. This calls for pre-cooling the mill feed, often to a very low temperature, then reducing the material progressively. As it first enters the mill, it will reduce until its temperature reaches a point of excessive resistance to further reduction. The fines must then be progressively and continuously removed as well as the whole mill charge before its temperature becomes excessive. The oversize is then pre-cooled and returned to the feed for further reduction in a continuing cycle.

In many grinding operations involving mixed materials of varying specific gravity or degrees of grindability, or materials like seeds and grains having fibrous portions that must be removed from the product, a multiple stage or step operation is required. The material fed to the first unit is only partially reduced as it enters the classification chamber where the fines of any desired maximum particle size may be removed for separate treatment and the remaining oversize scavenged off for further reduction in a second milling unit with or without intermediate treatment or processing by other means.

The principal object of this invention is to provide an improved milling and classifying apparatus disposed on a horizontal axis and having uniform tangential controlled air and feed supply, a uniform axial distribution of grinding and classifier surface and a continuous, uniform and complete withdrawal of the finished product from the grinding zone to obtain maximum efficiency and obviate overgrinding.

Another object of this invention is to provide an improved method of disintegrating and classifying dry solid particles in which the controlled feed and air supplies are fed tangentially uniformly into grinding and classifying zones and in which a continuous, uniform and complete withdrawal of the finished product from the grinding zones is obtained.

It is also an object of the present invention to provide apparatus which will meet all the requirements for milling and size separation or scavenging above recited and to provide apparatus of highest possible efficiency in respect to particle reduction.

It is another object of the invention to provide apparatus having maximum possible precision in particle sizing in respect to the mill product produced.

It is a further object of the invention to provide for the reduction of material to any degree of fineness with a minimum of superfines and to make possible the reduction of heat sensitive materials to any degree of fineness at minimum cost.

It is a further object of the invention to provide apparatus by which unwanted hard or dense materials occurring in natural substances may be separated from the wanted portion.

It is also an object of the invention to provide an apparatus for the reduction and classification of materials and readily adapted to a wide variety of purposes, materials, particle size reduction and classification.

A still further object of this invention is to provide a horizontal apparatus comprised of a plurality of alternate grinding and classifying zones.

Still another object is to provide an improved unitary milling and classifying apparatus in which the grinding and classification may take place in a single zone.

A further object is to provide a unitary grinding and classifying rotor adapted for use in the casing of a mill for disintegrating and classifying dry solid materials.

Other objects of this invention will become apparent as the description proceeds.

To the accomplishment of the foregoing and related ends this invention then comprises the features hereinafter fully described and particularly pointed out in the claims, the following description setting forth in detail certain illustrative embodiments of the invention, these being indicative, however, of but a few of the various ways in which the principle of the invention may be employed.

The invention is further illustrated with reference to the drawings in which corresponding numerals refer to the same parts and in which.

Referring now to the drawings and particularly to Figures 1 to 5, the exemplary form of the apparatus shown in these figures consists of a unitary horizontal milling and classifying device. The apparatus is divided generally into a cylindrical casing indicated generally at 10 enclosing the grinding and classifying zones of the apparatus and at one end thereof a fan housing indicated generally at 11. Casing 10 is enclosed between two end plates 12 and 14 disposed at either end of the casing and extending to a base or floor where they are held fixed by floor flanges 15 and 16. End plate 12 is provided with a large annular opening 17 and end plate 14 is provided with a somewhat smaller annular opening 18 which is concentric with 17. The fan housing likewise has two end plates 20 and 21. Plate 21 is provided with a large annular opening 22 corresponding generally in size to 17 and plate 20 is provided with a somewhat smaller annular opening 23. The fan housing 11 is held spaced apart from the milling and classifying casing 10 by means of a cylinder of heavy plate 25 provided with a flange at 26. Cylinder 25 is provided with one or more openings 25A so as to admit atmospheric air to the space 28 between the fan housing and to the mill and classifying casing. Suitable dampeners (not illustrated) may also be provided to regulate the admission of atmospheric air into space 28. Alternatively, the fan housing 11 may be held spaced apart from the cylindrical casing 10 simply by braces leaving the space 28 between the two sections open to atmosphere. For ease in assembling and disassembling the apparatus, it is preferred that plates 12, 14, 20 and 21 be formed in two parts, flanged at their juncture and bisecting the annular openings, as shown particularly in Figure 4.

Figure 1:
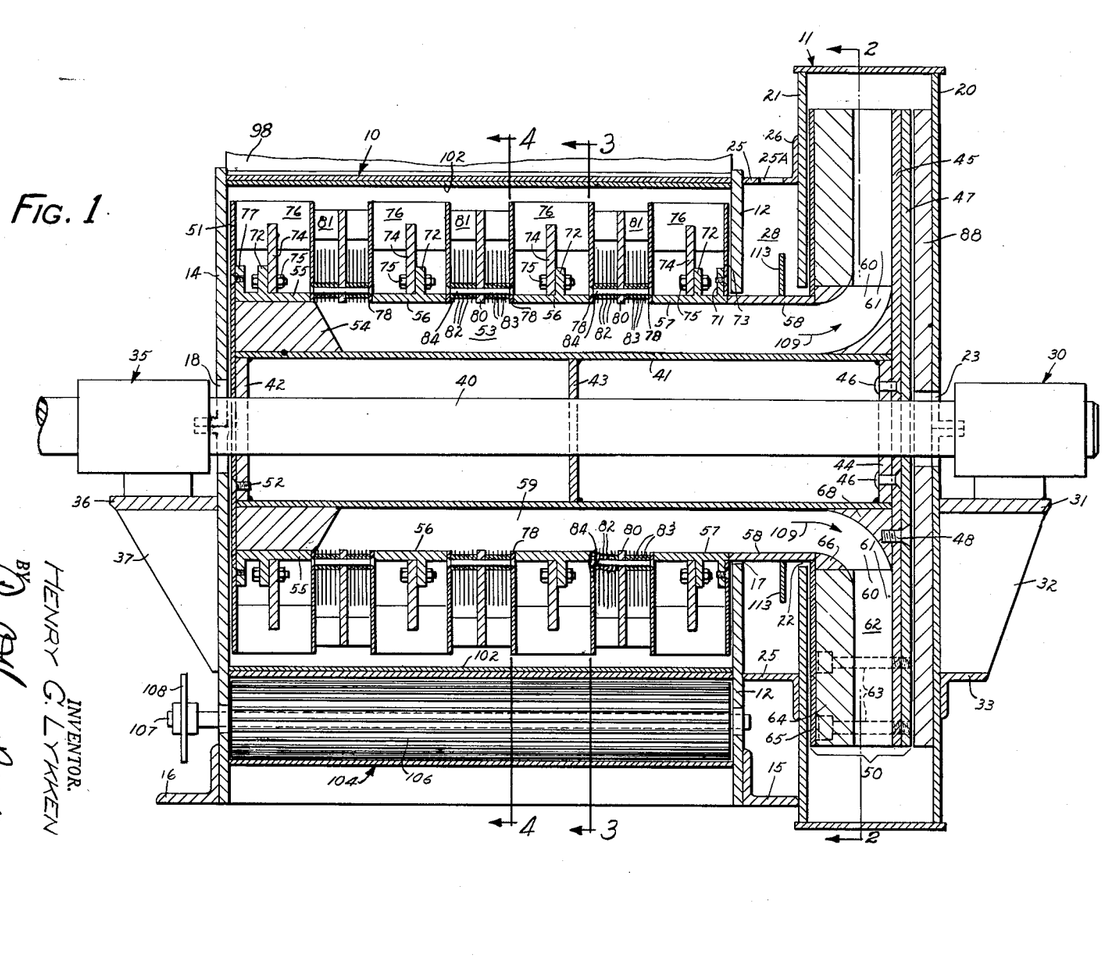
Figure 1 is a vertical sectional view of an exemplary form of the milling and classifying apparatus of the present invention.

A bearing structure indicated generally at 30 is mounted outside the fan housing disposed opposite annular opening 23 mounted upon a face plate 31 which is supported by a gusset 32 and angle 33. A similar bearing structure indicated generally at 35 is disposed at the opposite end of the apparatus adjacent annular opening 18 and mounted on a base plate 36 supported by a gusset 37. The details of the construction of the bearings 30 and 35 are within the province of mechanical design and need not be further explained here except to state that the bearings are preferably of the ball or tapered roller type and they are adequately sized to carry the rotor of the mill and classifier structure at the speeds desired and are adequately protected against the entrance of abrasive material into the bearings. Upon the bearings 30 and 35 there is mounted a shaft 40 for rotation concentrically with the axis of the entire mill, classifier and fan structure. The shaft may be rotated by means of a pulley (not shown) mounted on the projecting end of the shaft and belted to any suitable motor or may be directly connected to a motor of suitable design or driven by a variable speed motor.

The shaft 40 is enlarged and reinforced by a tube 41 secured to the shaft by end closure 42 at one end, an annular brace 43 approximately in the center and end closure 44 at the other end. The shaft and tube 41 are accordingly very rigid in design. The shaft 40, end closures 42 and 44, brace 43 and tube 41 are all welded into a unitary structure and all rotative elements are mounted on and driven by the tube 41.

The exhaust fan disk 45 is riveted to end closure 44 as at 46 and a reinforcing disk 47 is bolted thereto as at 48 to form a composite end plate for the impeller fan structure indicated generally at 50. An end plate 51 at the opposite end of the rotor is bolted to end closure 42 as at 52.

Secured to the tube 41 are a plurality of radial spline members 53. Mounted on the tube 41 at the end thereof opposite the fan housing is a tapered cylindrical spacing member 54. Around this member and around the radial spline members 53 are a plurality of tube sections 55, 56, 57 and 58. The axial spaces outlined between these tubular sections and the radial spline members provide a plurality of longitudinal passageways 59 to the impeller fan structure 50. The longitudinal passages 59 terminate in inlet passageways 60 to the fan unit.

Figures 2, 6:
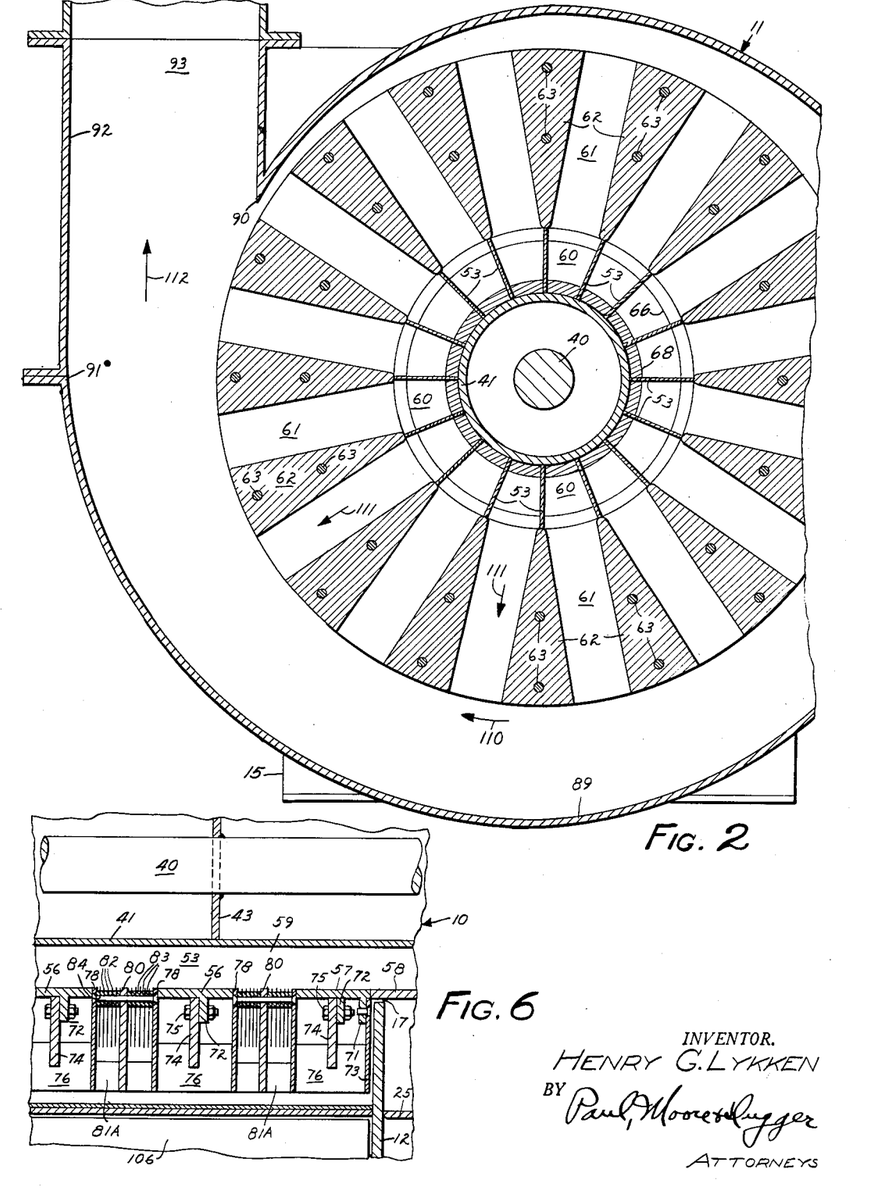
Figure 2 is a transverse sectional view of the fan portion of the apparatus taken along the line and in the direction of the arrows 2—2 of Figure 1.
Figure 6 is a vertical sectional view of a slightly modified form of grinding and classifying zones of the apparatus of this invention.

Referring momentarily to Figure 2, the inlet passageways 60 to the fan lead to radial channels 61 formed by spaced segmental blocks 62 bolted to the fan end plate 45—47 by bolts 63 which pass through annular spacer block 64 which in turn is fixed to fan end plate 65 which is welded to tubular member 58. The inner annular surface of spacer block 64 is curved as at 66 and a curved spacer 68 is smoothly curved adjacent the curved portion 66 so as to maintain uniform clearance in the passageway 60.

Within the milling and classifying casing the rotor carries a plurality of at least three alternate disintegrating and classifying units, that is, at least two milling units and one classifying unit or two classifying units and one milling unit. Reading from the direction of the fan housing, the first milling section comprises tubular section 57 mounted on the radial spline members 53 and carrying an end flange 71 and an intermediate flange 72 on its outer periphery. Bolted to end flange 71 is an annular disk 73 which acts as an end plate for the milling and classifying portion of the rotor. A slotted annular plate 74 is bolted to the intermediate flange by bolts 75. The periphery of plate 74 is provided with a plurality of radial slots into which are fitted radial vanes 76. The intermediate milling sections comprise tubular sections 56 mounted on the radial spline members 53 and bearing only one intermediate flange 72. To each of these intermediate flanges is bolted an annular slotted plate 74 bearing a plurality of radial vanes 76 as described heretofore. Although in the embodiment here illustrated there are shown but two intermediate milling zones, this number may be varied widely depending upon varying requirements. The outermost milling unit corresponds generally to the first described milling unit. It comprises a tubular section 55 which is mounted upon the tapered cylindrical spacing member 54 and bears an end flange 77 by which it is bolted to end plate 51, and an intermediate flange to which is bolted a slotted plate carrying a plurality of radial vanes as in the case of each of the other grinding units.

Alternating between the grinding units are a plurality of classifying units separated from the grinding units by diaphragms 78. Each of the classifying units is made up of a central annular slotted plate 80 having a plurality of radial vanes 81 inserted in the slots on the periphery of the plate. On either side of plate 80 are a plurality of relatively thin plates 82 held in closely spaced relation by washers 83 threaded upon clamping rivets 84 (or alternatively bolts 84a as in Figures 7 and 8) and clamped down tightly between diaphragms 78.

An annular spacer 88 is positioned in the space between the end plate 45—47 of the fan blade structure and the end plate 20 of the fan housing. As best shown in Figure 2, a scroll housing is provided around the fan impeller unit, said housing being composed of an outer spiral plate 89 of gradually increasing radius in the clockwise direction from the point 90 to the point 91, the housing being provided with an outlet tube 92 presenting the outlet opening 93.

Figure 3:
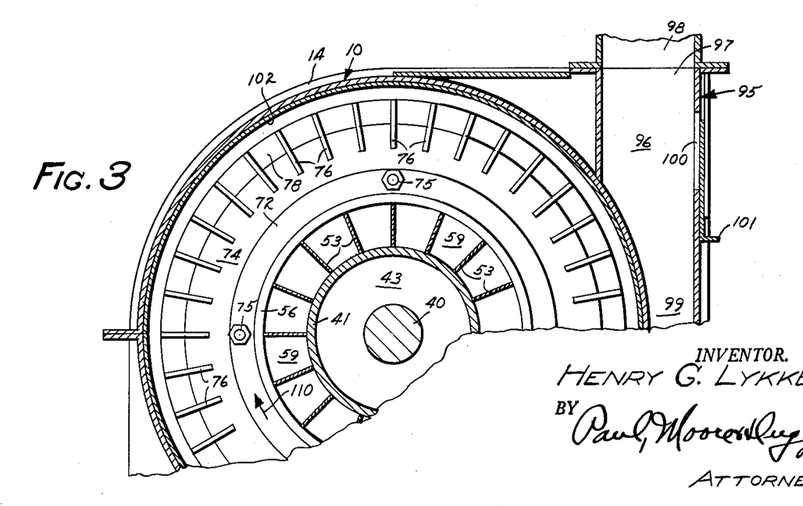
Figure 3 is a transverse sectional view of a grinding section of this apparatus taken along the line and in the direction of the arrows 3—3 of Figure 1.
Figure 4:
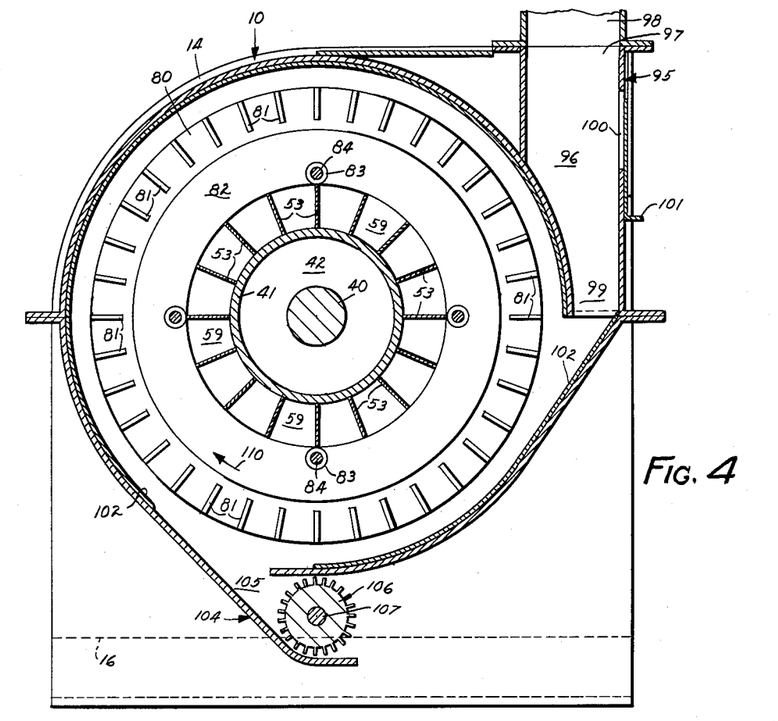
Figure 4 is a transverse sectional view of a classifying zone of this apparatus taken along the line and in the direction of arrows 4—4 of Figure 1.
Figure 5:
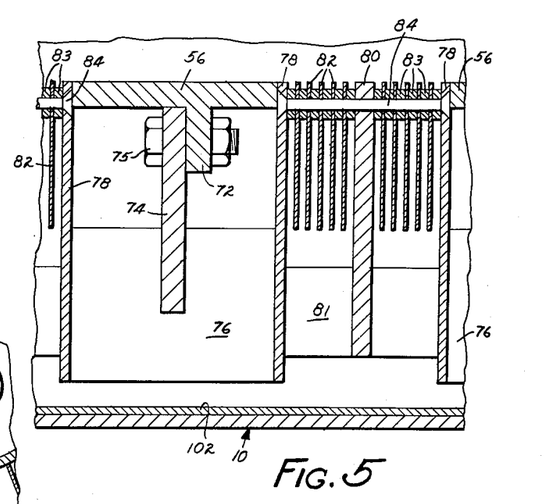
Figure 5 is an enlarged sectional view showing the details of construction of a portion of a grinding and of a classifying section.

As best shown in Figures 3 and 4, the apparatus of this invention is provided with a tangential feeding unit indicated generally at 95 which runs longitudinally the entire length of the cylindrical milling and classifying section. The feeding unit is comprised of a hopper or a box 96 having an opening 97 at the top thereof covered by an open cover plate 98 through which the material to be fed may be dropped in controlled and regulated amounts from any suitable feeder means not shown. The hopper 96 terminates in a narrowed discharge throat 99 that extends lengthwise of the mill from plate 12 to plate 14. One or more ports 100 provided with slidable damper cover means 101 regulate the amount of air or other gaseous fluids which may enter into the feeder.

Figure 9:
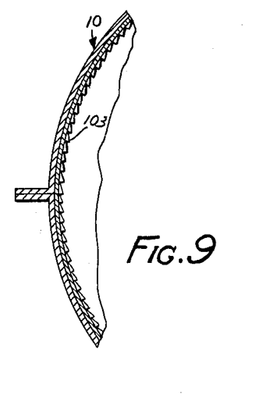
Figure 9 is a fragmentary transverse section taken through the wall of the casing of the apparatus of this invention showing a slightly modified form thereof.

The milling and classifying casing is normally provided with a replaceable lining 102 which may be of smooth, wear-resistant material or alternatively, as shown in Figure 9 at 103, may have cutting edge surfaces or abrasive surfaces as conditions may require.

A skimmer outlet box indicated generally at 104 is provided along the full length of the mill bottom to remove denser and harder contaminating material such as silica and the like from the grinding cylinder. The skimmer outlet comprises a discharge opening 105 from the grinding section and an elongated corrugated roller 106 on shaft 107 journaled in end plates 12 and 14 is positioned in the opening and suitable means such as pulley 108 are provided for driving the roller at a regulated rate to remove the contaminating material.

Figure 7:
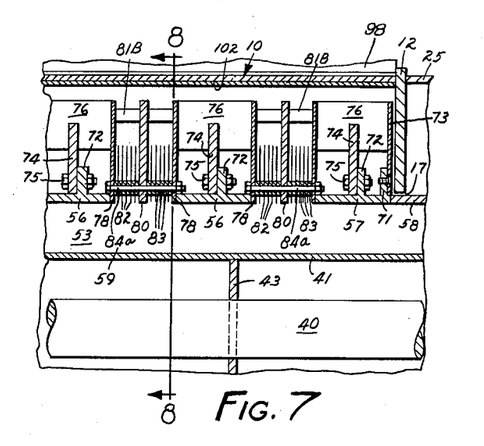
Figure 7 is a vertical sectional view of a still further modified form of grinding and classifying sections of this invention.
Figure 8:
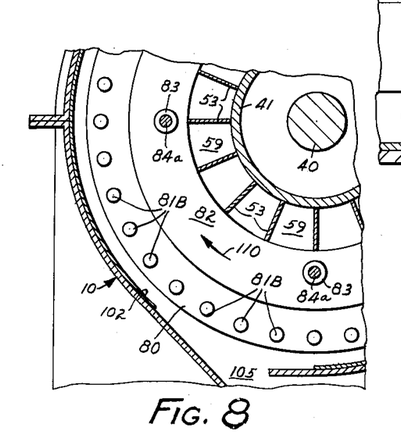
Figure 8 is a transverse sectional view taken along the line and in the direction of arrows 8—8 of Figure 7.

In the form of the invention illustrated in Figures 1, 3, 4 and 5, the radial vanes of the grinding or milling rotors extend into the cylindrical casing farther than the radial vanes of the classifying rotors. A modified form of the invention is illustrated in Figure 6 wherein radial vanes 81A of the classifying rotors are shown to be coextensive with the radial vanes 76 of the milling rotors. A still further modification is shown in Figures 7 and 8 wherein round pins or rods 81B are substituted for the vanes of the classifying rotors.

Broadly stated, the operation of the apparatus of this invention comprises the steps of feeding a controlled supply of dry solid material and air (or other reactive or inert gaseous carrier) tangentially to the elongated horizontally disposed generally cylindrical grinding area for uniform distribution longitudinally over the surfaces thereof, continuously grinding the solid material by attrition of particle against particle, particle against the air stream and, to some extent, particle against surfaces and projections of the mill itself by rotatively whirling a fluidal stream of particles of the solid material entrained in the gaseous fluid at high velocity in an arcuate path around the outer periphery of the cylindrical grinding area, thereby setting up an outer vortex action; separating the finer ground particles from the coarser particles into distinct zones of differing particle sizes by whirling a plurality of smaller fluidal streams of ground particles of the solid material entrained in the air at high velocity in arcuate paths in narrow segregated radial zones around the inner periphery of the cylindrical grinding area setting up a plurality of inner vortex classifying actions, drawing air inwardly through these inner classifying vortices whereby the inner classifying vortices are distorted and elongated radially inwardly, intercepting the path of the thus distorted inner classifying vortex in a zone in which at least part of the circulating particles are of the desired size and continuously and repeatedly withdrawing at least part of these desired size particles from the classifying zone by suction whereby the desired fine particles are uniformly and completely removed from the grinding zone.

In the operation of the apparatus of this invention the material to be ground and classified is fed at a regulated rate into hopper 96. At the same time air or other gaseous fluid is admitted into the hopper through port 100 at a regulated rate as determined by the position of damper 101. The material drops through discharge opening 99 and is fed tangentially into a cylindrical casing in which the rotor carrying the alternately spaced milling and classifying sections is rotating at high speed in the direction of arrows 110. The pulverization of the material takes place by means of a vortex of the gaseous suspended material in which reduction in particle size is principally by impact and attrition of particle upon particle, as described in my earlier Patent No. 2,294,920 issued September 8, 1942. In that patent it is explained how an outer vortex is set up by the action of the radial vanes of the rotor taking up the air and whirling it around the milling and classifying casing, thereby setting up a vortex beyond the tips of the rotor blades. As the material is fed it is picked up in the whirling air in the attrition chamber and caused to circulate around the same, the material being entrained and conveyed in the air currents. The particles of material entering the machine are picked up by this outer vortex and generally are of comparatively large mass and weight. The centrifugal action of the whirling mass of particles and air will cause the larger and heavier particles to be carried around the outer surface of, and the lighter particles on the inner surface of this vortex.

The action occurring in this outer vortex may be explained as follows: All the while milling action, due to the inertia of the particle in the air moving at high speed in the vortex, is continuing and the particle size is being reduced. As the individual particle is reduced in size, the influence of centrifugal force thereon becomes less and the particles move in toward the rotor blades. Also, in its travels the particle is constantly eroded by the high speed air currents and reduced in size by collision with other particles in its path. Thus, the particles have two paths, one a somewhat circular path, and a second path substantially in the plane of its circular motion and at right angles toward the center of the machine as it is reduced in size.

By properly spacing the radial vanes of the rotor, vortices will also be set up between these vanes which will be termed inner vortices. These inner vortices are formed in the following manner: The forward travel of each vane or blade 76 creates a vacuum. Immediately behind the blade there is an immediate inrush of air to fill the vacuum. That air is taken in part from the inner edge of the outer vortex and such air is laden with finely pulverized material. Air to fill the vacuum is also partly obtained from about the tip of the next following blade, which air slips from in front of the blade and around its tip. The following blade advancing toward the vacuum compresses the air directly in front of it, and this air also rushes in to fill the vacuum at very high speed due to its increased pressure. The result of these several forces will be to produce a somewhat circular high speed vorticose movement between each set of opposing faces of the radial vanes.

As the particle size is reduced, greater and greater intensity of impact is required to effect further reduction. It is not practical to provide adequate peripheral velocity sufficient for very fine grinding as the practical, mechanical and economic limit is reached at or near 300 feet per second. In these closed circuit vortices between the blades, however, velocities many times the peripheral velocity of the rotor obtain due to the high intensity of the multiple forces inducing the same.

These inner vortices are inherently high speed vortices with respect to the outer vortex, and their speed is rendered even higher by reason of the high peripheral speed of the rotor. The rotor may operate, for example, at a high peripheral speed of the order of 150 miles per hour, although lower and higher speeds between about 75 to 200 miles per hour, that is between about 100 and 300 feet per second, are entirely successful. The inrush of material laden air to fill the vacuum created behind each vane causes innumerable high speed impacts and collisions of the particles upon each other which together with the pull against the inertia of the particles in the vortices and the very high speed of the vortical air currents results in a rapid attrition of the particles to rapidly produce large quantities of very small particles.

For the efficient operation of the apparatus it is imperative that the fine pulverized material of desired size be removed from the attrition zone as rapidly as possible. For this reason I have alternated classifying sections between the several grinding sections. Each classifying zone is opened through the thin blades 82 into the longitudinal ducts or passageways 59 which connect at 60 with the radial passageways 61 of the fan impeller unit. The action of the particle laden air in the classifier zones is identical with that in the grinding zones except that it is subjected to an additional force as air is drawn centripetally into and through the classifier rotor and out through the longitudinal ducts 59. This centripetal action is sufficient to carry the finished product out through the longitudinal ducts in the direction of arrow 109 and thence out through the channels 61 between the segmental spacers 62 of the impeller fan in the direction of arrow 111 and thence out through the outlet in the direction of arrow 112. The particle size is regulated by the diameters of thin plates 82, the spacing between the thin plates 82, the spacing and depth of radial vanes 81, the speed of rotation of the classifying rotor and the like.

Figure 10:
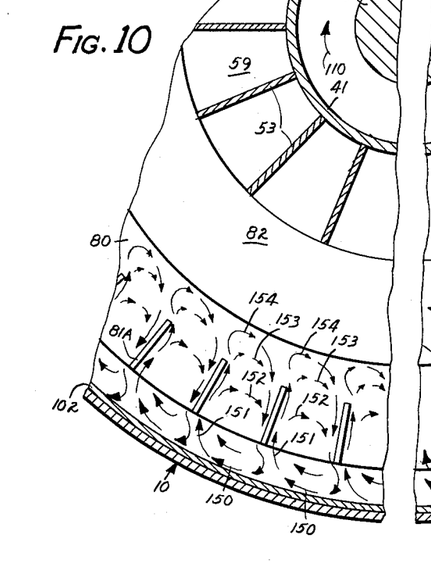
Figure 10 is a fragmentary transverse sectional view of a classifying section of the apparatus as in Figure 4 showing in simplified and diagrammatic form the vortex action in the classifying zones due to the action of the classifying rotor alone.
Figure 11:
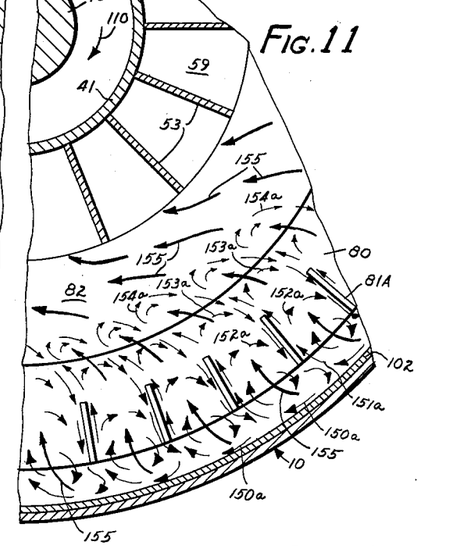
Figure 11 is a similar fragmentary transverse sectional view of the classifying section as in Figure 10 showing in simplified and diagrammatic form the vortex action in the classifying zones due to the action of the classifying rotor and the additional draft of air due to the action of the impeller fan unit.

The nature of the classifying action of the rotor and radiating disks of the classifying sections of the apparatus of this invention is best understood by reference to Figures 10 and 11 of the drawings. These figures comprise generally fragmentary transverse sectional views taken through a classifying section of the apparatus and show in greatly simplified and diagrammatic form my understanding of the vortex action of the classifying zones as due to the action of the classifying rotor alone in Figure 10 and the modified vortex action due to the additional air action of the impeller fan unit in Figure 11. The action of the outer vortex is indicated generally by arrows 150 and is similar to the action of the outer vortex of the milling units as heretofore described.

The action of the inner vortices is indicated generally by arrows 151—154. As described heretofore with respect to the inner vortex action of the milling units, the forward travel of each vane or blade 81 creates a vacuum immediately behind the blade, and there is an immediate inrush of air to fill the vacuum. That air is taken in part from the inner edge of the outer vortex where such air is laden with finely pulverized material. The following blade advancing toward the vacuum compresses the air directly in front of it, and this air also rushes in to fill the vacuum due to its increased pressure.

The resultant intra-blade vortex action produces a supplementary grinding of the solid material. The fluidal material, that is the fine particles entrained in air from the grinding zones, is being continually sucked into the rotor into the vortices between each pair of blades 81A. This intra-blade vortex action extends both into the grinding space between the blades and beyond into the space radially inward from the toe of the blades. The depth of the intra-blade vortex beyond the toe of the blades is dependent upon factors such as the spacing of the blades, the speed of the rotor and the like, and for any given set of conditions upon the influx of air through the intra-blade spacings and out through longitudinal channels 59 between radial splines 53, as indicated in Figure 11 by heavy arrows 155.

The intra-blade vortex action causes a sorting action as well as the grinding action. The large particles barely enter the inner vortex before they go out again. Somewhat finer, but still relatively coarse, particles will enter further, as indicated by arrows 152, before going out again. Relatively fine particles will go in even further extending into the space beyond the toe of the blades, as indicated by arrows 153, and will then go out again. Only the very finest particles will flow into the very tip of the vortex, as indicated by arrows 154.

By varying the spacing of the blades and the velocity of the rotor, a preferred vortex shape for any given material and size range may be obtained. It should be remembered that the theory of operation presented in the drawings (particularly Figures 10 and 11) is greatly over-simplified and that the gradation of particle sizes within the vortex is infinitely finer and more precise than illustrated.

It will be seen that there is a continuous and positive classifying action with all of the fines and near fines being continuously sucked out of the grinding load and brought into the rotor inside the periphery of the blades. The particles are graded in size radially within the vortex from colloidal material at the apex to the largest particle size that can get through the blades of a given depth and spacing at the outer base.

It will be observed that all of the material entering the rotor attains a high centrifugal energy. A preferred range of operation is between 1200 to 1600 times the force of gravity. This is, of course, a function of peripheral velocity and can be varied at will. Classification as to particle size is due to the outward pull of gravity as against the inward drag of air flow in diametrically opposite directions.

To obtain an adequate differential between these two forces in the case of sub-sieve material, it is, therefore, necessary to increase as much as possible the centrifugal force as between particles of different sizes. The difference between force of gravity upon the mass of a 5 micron particle and a 10 micron particle as to air drag or air velocity is negligible due to their small mass. However, when the gravitational pull is increased, say 1500 times, even the smallest particle becomes an entity calling for a definite and regulatable air drag.

The gravitational force against particles of any given size may be varied and the particle size determined by regulating the air volume, hence the air flow and the drag within a range for any given material and classifier arrangement.

It has already been noted that the rotor blading of the classifier performs the above functions. The radial depth of the now graded zone of particle size distribution may be increased and the intra-blade vortex action expanded inwardly as much as may be desired by the impeller fan unit which draws a regulatable amount of air through the classifier against the resistance of the classifier rotor, considered as a closed end fan, and through the intra-blade vortex action. This will be noted in Figure 11 where an inflow of air induced by the impeller fan unit, indicated generally by heavy arrows 155, distorts the inner vortex, indicated now by arrows 151a to 154a, inwardly and tends to further separate the paths of the particles of different sizes.

One function of the spaced disks or plates 82 is to maintain a parallel uniform flow the full width of the classifier. They provide an element of resistance to obtain a uniform direction and velocity of flow, but more particularly they serve to provide a predetermined cut-off point where the outgoing material actually leaves the mill.

If no discs are used, or if a cylindrical screen is substituted for the discs, only the very finest colloidal dust would come out, even with a substantial flow of air induced by the fan unit. The disc channels must extend out to the zone where the wanted size of solid material circulates and intercept their flow in the intra-blade vortex.

Assuming the desired particles to be of the size flowing along the lines of arrows 154, be they all 50 microns and finer, all 40 microns and finer or so on down to all 1 micron and finer, it is only necessary that the periphery of disc 82 reach out into the intra-blade vortex into the path of the desired particle size as shown in Figure 11 where the discs intercept the flow of the apex of the distended vortex arrows 154a. If finer particle size is desired smaller diameter discs are used, and if coarser particle size is desired larger diameter discs are used.

It is not necessary to extend the cut-off into questionable zones involving possible danger of capturing oversize particles. It is only necessary to pick up a small percentage of the wanted size entering the intra-blade vortex at any one time. Even 5 per cent would be more than ample since the material enters the vortex and the separation zone hundreds of times a second. The operation is in the meantime under positive control and instant adjustment by the inlet air control.

Figure 12:
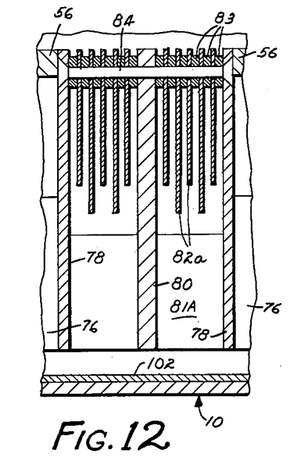
Figures 12, 13 and 14 are enlarged fragmentary sectional views through the classifying sections of the apparatus showing modifications in the arrangement of the classifying discs comprising the classifying units.
Figure 13:
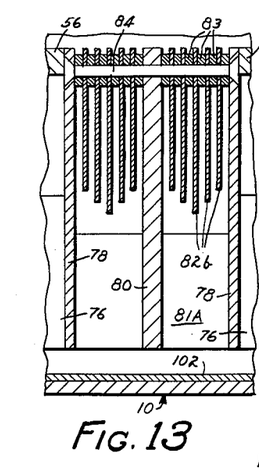
Figure 14:
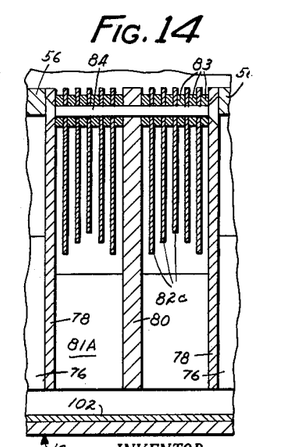

A secondary classification can be provided for within the disc pattern itself by varying the diameters of the discs within any given classifying zone. This may take the form of alternate discs of larger and smaller diameters, as shown at 82a in Figure 12, of discs of larger diameters in the centers of the classifying zones tapering off through discs of gradually smaller diameters toward the edges, as shown at 82b in Figure 13, or of discs of smallest diameter in the center tapering off to larger diameter discs at the edges, as shown at 82c in Figure 14, or variations of these patterns.

For many operations involving very little grinding effort only classifier rotors need be used since the classifier blading has considerable grinding effect, adequate in many cases without the use of separate grinding rotors.

Disposing the rotor bearing the grinding and classifying sections horizontally in a horizontal cylindrical casing provides a grinding bed in depth under the rotor with a continuous circulation of high velocity air around the rotor within the suction or pickup range of the classifier for complete and effective elimination of finished material from the grinding zones and withdrawal into the classifier. Hence, this horizontal positioning of the rotor is a definite element in obtaining the desired classifying action. Complete and continuous pickup of the finished material is essential in efficient grinding but is at the same time a function of the classifier and its accessories and their location.

In the case of this invention the peripheral blading of the classifier rotor continuously draws all the fines into the rotor, independently of the air drawn through the rotor, in a continuous recirculation within the blading and above the grinding bed.

The material to be reduced contains other material which is denser and harder to grind, for example, silica. Means are provided to segregate and remove such material from the grinding zone. It will be noted that the grinding bed running the full length of the mill bottom is tangential and is deeper allowing the denser material to work itself down through the fluidal grinding load below the grinding surface and into the skimmer outlet box. The suction and agitating effect of the mill rotor insures a positive and clear-cut stratification to some depth. If the withdrawal at the bottom is continuous at the rate of accumulation, all of the denser material can be removed. This may be accomplished by driving the corrugated roller 106 at a regulatable rate.

In addition to the forms specifically illustrated here, the reducing or grinding elements may also be of the type shown in my copending application Serial No. 328,016, filed December 26, 1952, my earlier United States Patents No. 2,440,285, issued April 27, 1948, No. 2,294,920, issued September 8, 1942, or other related Lykken patents. Likewise, the specific form of classifier units may be replaced by any of the forms shown in my copending applications Serial No. 278,239, filed March 24, 1952; Serial No. 306,126, filed August 25, 1952; and Serial No. 311,714, filed September 26, 1952.

All of the rotor elements are interchangeable. Each of the grinding and classifying units is a unitary assembly and interchangeable with variations of the same. The number and positioning of the several units may be varied at will, depending upon the requirements of the particular material being pulverized. The number and diameter of discs in each classifier unit may be changed to provide the desired selection of particles. The reducing and classifying elements may have substantially the same diameter, or may vary somewhat as shown in the various modifications here illustrated. In all forms of the invention, however, as the material is being reduced, it is immediately withdrawn by and into the classifier unit.

Sufficient atmospheric air is allowed to enter from space 28 and through annular openings 17 and 22 to prevent an escape of finely pulverized material through these openings. An annular baffle member 113 prevents any tendency of the flow of air through annular opening 22 to draw particles through annular opening 17 from the milling zones.

It is apparent that many modifications and variations of the invention as hereinbefore set forth may be made without departing from the spirit and scope thereof. The specific embodiments described are given by way of example only and the invention is limited only by the terms of the appended claims.

What I claim is:

1. A mill for disintegrating and classifying dry solid material comprising a horizontal cylindrical casing having a plurality of alternate grinding and classifying zones, a longitudinal inlet to the casing, closures at each end of the casing, one of said closures having an annular opening, a rotor journalled for rotation in the casing and projecting through said annular opening, a plurality of alternating grinding means and classifying means disposed longitudinally on said rotor in said grinding and classifying zones, at least one passageway in said rotor leading from said classifying zones longitudinally, in direct communication with radial fan passageways in the rotor at the end thereof projecting through the annular opening, a housing enclosing said radial fan passageways forming a fan housing, said housing being spaced from said annular opening to provide an air inlet to the annular opening.

2. A mill for disintegrating and classifying dry solid material comprising a horizontal cylindrical casing having a plurality of alternate grinding and classifying zones, a longitudinal inlet for introducing the solid material to be ground and classified to the casing, said inlet disposed longitudinally of the casing and to one side thereof for uniformly feeding the solid material tangentially into the grinding and classifying zones, closures at each end of the casing, one of said closures having an annular openings, a rotor journalled for rotation in the casing and projecting through said annular opening, a plurality of grinding means and classifying means alternately on the rotor in said grinding and classifying zones, at least one passageway in said rotor leading from said classifying zones longitudinally, in direct communication with radial fan passageways in the rotor at the end thereof projecting through the annular opening, a housing enclosing said radial fan passageways forming a fan housing, said housing being spaced from said annular opening to provide an air inlet to the annular opening.

3. The apparatus of claim 2 further characterized in that a longitudinal skimmer opening is provided in the wall of the casing adjacent the bottom thereof for removing relatively coarse particles from said grinding and classifying zones.

4. The apparatus of claim 3 further characterized in that an elongated longitudinally corrugated roller is rotatably mounted horizontally outside of the casing adjacent to said skimmer opening as a metering closure therefor, for removing relatively coarse particles from said grinding and classifying zones.

5. The apparatus of claim 2 in which each of said grinding means comprises an annular plate carrying a plurality of radial vanes, substantially perpendicular to the plate, upon its perimeter.

6. A mill for disintegrating and classifying dry solid material comprising a horizontal cylindrical casing having a plurality of alternate grinding and classifying zones, a longitudinal inlet to the casing for solid material to be ground and classified, closures at each end of the casing, one of said closures having an annular opening, a rotor journaled for rotation in the casing and projecting through said annular opening, a plurality of rotary grinding means and classifying means alternately on said rotor in said grinding and classifying zones, annular diaphragms across said casing separating the grinding and classifying zones, said diaphragms having diameters less than that of the casing so as to leave a narrow annular passage between the edges of the diaphragms and the inner wall of the casing, said rotor having an enlargement of increased diameter at the end thereof projecting through the annular opening, said enlargement having spaced radial passages therethrough forming a fan portion, at least one passageway in said rotor leading from said classifying zones longitudinally, in direct communication with the radial fan passageways in the enlarged end of the rotor, a housing enclosing the fan portion, said housing having an outlet opening for the ground and classified solid material and said housing being spaced from said annular opening in the casing so as to form an antrum into which gaseous fluid may enter for passage to and through the annular opening.

7. The apparatus of claim 6 further characterized in that each of the classifying means includes a plurality of spaced circumferential fins projecting radially from the rotor within the casing and adjacent the longitudinal passageway forming a plurality of radial slot passageways in direct communication with said longitudinal passageway.

8. The apparatus of claim 7 further characterized in that the spaced circumferential fins are stacked closely adjacent each other in slightly spaced relation and means is provided for clamping each of the stacks of fins into a rotative unit on the rotor.

9. The apparatus of claim 6 in which each of said grinding means comprises an annular plate carrying a plurality of radial vanes, substantially perpendicular to the plate, upon its perimeter.

10. A mill for disintegrating and classifying dry solid material comprising a horizontal cylindrical casing having a plurality of alternate grinding and classifying zones, an inlet for said material disposed longitudinally of the casing and to one side thereof for uniformly feeding the solid material tangentially into the grinding and classifying zones, closures at each end of the casing, one of said closures having an annular opening, a rotor journaled for rotation in the casing and projecting through said annular opening, a plurality of rotary grinding means and classifying means alternately on said rotor in said grinding and classifying zones, annular diaphragms across said casing separating the grinding and classifying zones, said diaphragms having diameters less than that of the casing so as to leave a narrow annular passage between the edges of the diaphragms and the inner wall of the casing, an enlargement of increased diameter at the end of the rotor projecting through the annular opening, said enlargement being outside of the casing and having spaced radial passages therethrough forming a fan portion, at least one passageway in said rotor leading from said classifying zones longitudinally, in direct communication with the radial fan passageways in the enlarged end of the rotor, a housing enclosing the fan portion, said housing having an outlet opening for discharging the ground and classified solid material, said fan housing being spaced from said annular opening in the casing so as to form an antrum into which gaseous fluid may enter for passage to and through the annular opening into the grinding and classifying zones, means for regulating the flow of gaseous fluid into said antrum, a longitudinal skimmer opening provided in the wall of the casing adjacent the bottom thereof and an elongated longitudinally corrugated roller rotatably mounted horizontally outside of the casing adjacent to the skimmer opening as a metering closure therefor for removing relatively dense particles from said grinding and classifying zones.

11. The apparatus of claim 10 further characterized in that each of the classifying means includes a plurality of spaced circumferential fins projecting radially from the rotor within the casing and adjacent the longitudinal passageway forming a plurality of radial slot passageways in direct communication with said longitudinal passageway.

12. The apparatus of claim 11 further characterized in that the spaced circumferential fins are stacked closely adjacent each other in slightly spaced relation and means is provided for clamping each of the stacks of fins into a rotative unit on the rotor.

13. The apparatus of claim 10 in which each of said grinding means comprises an annular plate carrying a plurality of radial vanes, substantially perpendicular to the plate upon its perimeter.

14. The combination of a horizontal cylindrical casing, a longitudinal inlet to said casing, closures at each end of the casing, one of said closures having an annular opening, a rotor journaled for rotation within the casing and projection through said annular opening, at least one passageway running lengthwise of the rotor, a plurality of plates mounted on said rotor carrying a plurality of perpendicular radial vanes at their perimeter, a plurality of circumferential fins projecting radially from the rotor adjacent said passageway mounted on the rotor alternately with said plates, a fan portion having radial passageways mounted at the end of the rotor projecting through said annular opening and in direct communication with said lengthwise passageway and a housing enclosing said fan portion spaced from said annular opening to provide a gas inlet to said annular opening.

15. The apparatus of claim 14 further characterized in that the spaced circumferential fins are stacked closely adjacent each other in slightly spaced relation and means is provided for clamping each of the stacks of fins into a rotative unit on the rotor.

16. The apparatus of claim 14 further characterized in that the alternating plates carrying radial vanes and the circumferential fins are separated by annular diaphragms across said casing and having diameters less than that of the casing so as to leave a narrow annular passage between the edges of the diaphragms and the inner wall of the casing.

17. A mill for disintegrating and classifying dry solid material comprising a cylindrical casing, an inlet to said casing for said solid material, closures at each end of said casing, one of said closures having an annular opening, a rotor journaled for rotation in the casing and projecting through the annular opening, at least one annular plate mounted on said rotor within the cylindrical casing and carrying a plurality of radial vanes substantially perpendicular to the plate upon its outer perimeter, a plurality of thin spaced circumferential fins projecting radially from the rotor within the casing on either side of said annular plate carrying the radial vanes, at least one passageway in said rotor in direct communication from the radial slots between the spaced circumferential fins to radial fan passageways in the rotor at the end thereof projecting through the annular opening, and a housing enclosing said radial fan passageways forming a fan housing, said housing being spaced apart from said annular opening.

18. A mill for disintegrating and classifying dry solid material comprising a cylindrical casing, an inlet for feeding said dry solid material into said casing, closures at each end of the casing, one of said closures having an annular opening, a rotor journaled for rotation in the casing and projecting through said annular opening, at least one annular plate mounted on said rotor within the cylindrical casing and carrying a plurality of radial vanes substantially perpendicular to the plate upon its outer perimeter, a plurality of thin spaced circumferential fins projecting radially from the rotor within the casing on either side of said annular plate carrying the radial vanes, an enlargement of increased diameter at the end of the rotor projecting through the annular opening, said enlargement being outside of the opening and having spaced radial passages therethrough forming a fan portion, a plurality of passageways in said rotor in direct communication from the radial slots between the spaced circumferential fins to the radial fan passageways in the enlarged end of the rotor and a housing enclosing the fan portion, said housing having an outlet opening for discharging the ground and classified solid material and said fan housing being spaced from said annular opening in the casing so as to form an antrum into which gaseous fluid may enter for passage to and through the annular opening into the casing.

19. A disintegrating and classifying rotor adapted to be mounted in the casing of a mill for disintegrating and classifying dry solid material, said rotor comprising a shaft, radial splines on said shaft forming longitudinal passageways along said shaft, an annular plate encircling said splines and carrying a plurality of spaced apart radial vanes substantially perpendicular to the plate upon its outer perimeter, a plurality of thin closely spaced apart circumferential fins encircling said splines stacked on either side of said annular plate forming a plurality of radial slot passageways in direct communication with said longitudinal passageway and means for clamping the annular plate and said stacks of fins into a rotative unit.

20. A method of disintegrating and classifying dry solid materials which comprises feeding a controlled supply of dry solid material and gas tangentially to a horizontally disposed generally cylindrical grinding area for uniform distribution longitudinally thereover, continuously grinding the solid material at least in part by attrition of particle against particle and particle against gas stream by whirling a fluidal stream of particles of the solid material entrained in the gas at high speed in an arcuate path around the outer periphery of the cylindrical grinding area setting up an outer vortex action, separating the finer ground particles from the coarser particles by whirling a plurality of smaller fluidal streams of ground particles of the solid material entrained in the gas at high speed around the inner periphery of the cylindrical grinding area setting up a plurality of inner vortex actions, continuously and repeatedly withdrawing at least part of the desired fine particles from the inner vortices by distorting and elongating the inner vortices radially inward by suction whereby the paths of the particles of desired size may be intercepted and the particles are removed from the grinding zone by suction.

21. A method of disintegrating and classifying dry solid materials which comprises feeding a controlled supply of dry solid material and air tangentially to an elongated horizontally disposed generally cylindrical grinding area for uniform distribution longitudinally over the surfaces thereof, continuously grinding the solid material at least in part by attrition of particle against particle and particle against air stream by rotatively whirling a fluidal stream of particles of the solid material entrained in the air at high velocity in an arcuate path around the outer periphery of the cylindrical grinding area setting up an outer vortex action, separating the finer ground particles from the coarser particles into distinct zones of differing particle sizes by whirling a plurality of smaller fluidal streams of ground particles of the solid material entrained in the air at high velocity in arcuate paths in narrow segregated radial zones around the inner periphery of the cylindrical grinding area setting up a plurality of inner vortex classifying actions, drawing air inwardly through said inner classifying vortices whereby the inner classifying vortices are distorted and elongated radially inward, intercepting the path of the thus distorted inner classifying vortices in a zone in which at least part of the circulating particles are of the desired size and continuously and repeatedly withdrawing at least part of these desired size particles from the classifying zone by suction whereby the desired fine particles are uniformly and completely removed from the grinding zone.

22. A mill for disintegrating and classifying dry solid material comprising a horizontal cylindrical mill casing having a plurality of alternate grinding and classifying zones, a longitudinal inlet to the casing, closures at each end of the casing, one of said closures having an annular opening, a rotor journaled for rotation in the casing, a plurality of alternate grinding means and classifying means mounted longitudinally on said rotor in the grinding and classifying zones, radial fan means exterior of the mill casing, at least one passageway leading from said classifying zones longitudinally through the annular opening in one end of the mill casing to radial passages in said fan, a housing enclosing said radial fan passageways forming a fan housing, said housing being spaced apart from said mill casing.

23. A mill for disintegrating and classifying dry solid material comprising a horizontal cylindrical mill casing having a plurality of alternate grinding and classifying zones, a longitudinal inlet to the mill casing for solid material to be ground and classified, closures at each end of the casing, one of said closures having an annular opening, a rotor journaled for rotation in the casing, a plurality of rotary grinding means and classifying means mounted alternately on said rotor in said grinding and classifying zones, annular diaphragms across said casing separating the grinding and classifying zones, said diaphragms having diameters less than that of the casing so as to leave a narrow annular passage between the edges of the diaphragms and the inner wall of the casing, a fan having spaced radial passages therein exterior of the mill casing, at least one passageway leading from said classifying zones longitudinally through the annular opening in one end of the mill casing to said radial passages in said fan, a housing enclosing said fan, said housing having an outlet opening for the ground and classified solid material and said housing being spaced apart from said mill casing.

24. The combination of a horizontal cylindrical mill casing, a longitudinal inlet to said mill casing, closures at each end of the casing, one of said closures having an annular opening, a rotor journaled for rotation within the casing, at least one passageway running lengthwise of the rotor, a plurality of plates mounted on said rotor carrying a plurality of perpendicular radial vanes at their perimeter, a plurality of circumferential fins projecting radially from the rotor adjacent said passageway mounted on the rotor alternately with said plates, a fan having spaced radial passages therein exterior of the mill casing, said radial fan passages being in direct communication through said annular opening in one end of said mill casing with said lengthwise rotor passageway, a housing enclosing said fan, said housing being spaced apart from said mill casing.

References Cited in the file of this patent

UNITED STATES PATENTS

| | | |
|---|---|---|
| 1,485,072 | Farner | Feb. 26, 1924 |
| 2,552,596 | Sheldon | May 15, 1951 |

FOREIGN PATENTS

| | | |
|---|---|---|
| 156,712 | Great Britain | Jan. 5, 1922 |